April 13, 1943. E. C. PITMAN Re. 22,301

CEMENTING PROCESS

Original Filed Oct. 30, 1935

Earle C. Pitman INVENTOR.

BY Frank C. Hilberg

ATTORNEY.

Reissued Apr. 13, 1943

Re. 22,301

UNITED STATES PATENT OFFICE 22,301

CEMENTING PROCESS

Earle C. Pitman, Red Bank, N. J., assignor to E. I. du Pont de Nemours & Company, Wilmington, Del., a corporation of Delaware Original No. 2,087,480, dated July 20, 1937, Serial No. 47,426, October 30, 1935. Application for reissue December 30, 1942, Serial No. 470,707

28 Claims. (Cl. 12—33)

Figure 1:
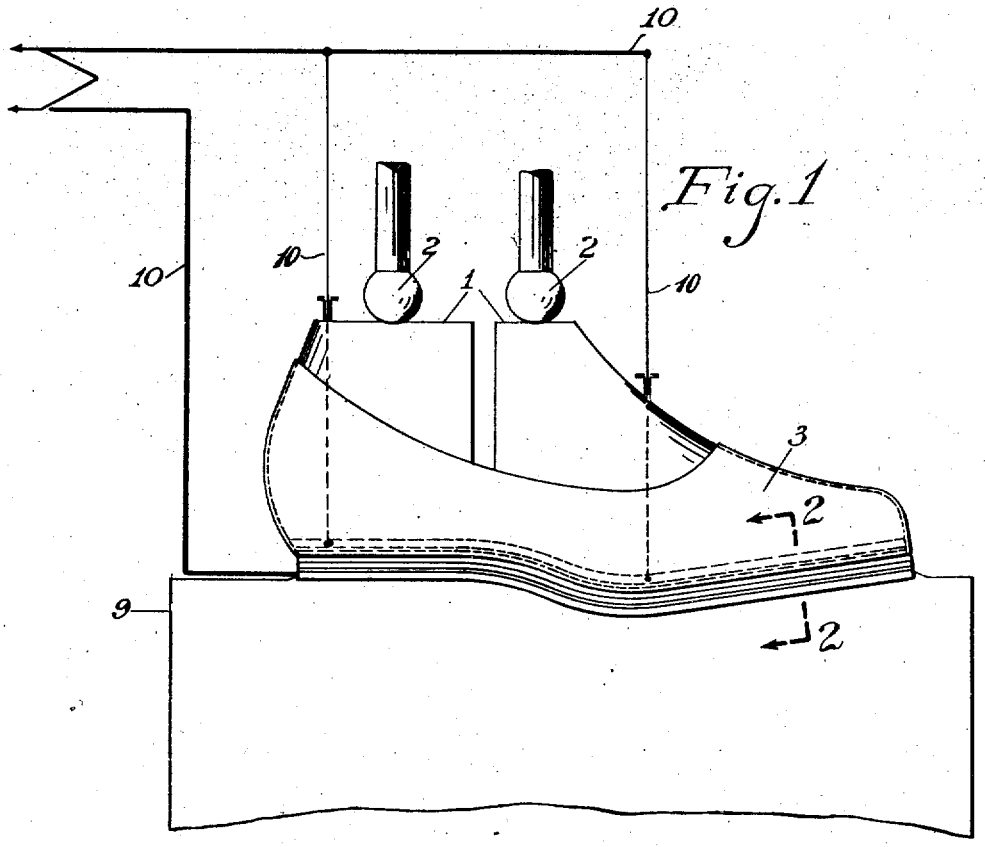

This invention relates to a method for adhesively joining surfaces and more particularly to a process for cementing shoe parts by activating a cement previously applied to the desired areas, with heat generated within and/or adjacent to the cement film, through the agency of high frequency electrical current.

Conventional methods for joining a plurality of surfaces by means of an adhesive provide for the application of the adhesive dispersed in appropriate solvents to one or more of the surfaces to be joined, followed by the pressing together of these surfaces while sufficient solvent remains to afford a tacky condition. This method, however, is obviously not suited for joining surfaces which are impervious to the passage of the solvent vapors, since it is the elimination of the volatile solvents that causes the cement to set and bring about the desired union of the surfaces.

A second method which has found some utility in adhesively joining surfaces involves the use of a cement which is activated by means of heat externally applied. This method has certain limitations, chief of which concerns its doubtful practicability for use with objects that have substantial thickness so that the problem of heat conductivity becomes an adverse factor. This is particularly limiting in joining leather parts or in laminating wood where the thickness may be substantial, with possible burning of the leather or wood in transmitting sufficient heat through these poorly conducting materials to activate the adhesive.

In the commercial manufacture of cemented shoes, a modification of the first described conventional method is resorted to. A suitable adhesive composition, for example, the commonly used cellulose nitrate cement, is applied to designated areas of the shoe parts to be joined, such as the over-lasted edge of the shoe upper and a limited area along the edge of the shoe sole, and the cement is allowed to dry. Immediately prior to assembling the parts carrying the dry cement coating, the cement is activated or rendered tacky on the surface by application of a suitable solvent or combination of solvents. The parts are then assembled at once and the unit placed in a pressure device and held under pressure for a period of sufficient duration to permit the elimination of the volatile solvents with a final set-up of the cement and the attainment of an acceptable joint.

This process, although employed almost universally in the industry for this type of shoe construction, has certain inherent limitations. For example, when the liquid softener is brushed over the dry cement film, "skips" or dry areas may result from careless application by the operator causing rejects because of faulty adhesion of the parts so joined. Also a period of from 12 to 20 minutes is usually required to eliminate sufficient of the volatile activator to permit removal of the unit from the pressure device without possible opening up of the joint, and further storage may be required to develop the final joint strength before the joined parts may be subjected to any considerable flexing.

The present invention is unique and commercially of interest in that the limitations of the methods heretofore available involving either the use of the thermoplastic cements applied and energized by orthodox procedures or the conventional use of volatile solvents to develop adhesion through tackiness, are largely eliminated.

This invention has as an object, the provision of a process for cementing surfaces together whereby greater uniformity with resultant increased aggregate joint strength is secured.

Another object of the invention is the provision of a process for cementing surfaces which permits the use of heat activated adhesives in joining surfaces of objects of substantial thickness which are generally adversely affected when subjected to elevated temperatures for even relatively short time periods.

Another object is the provision of a process for cementing surfaces which permits the use of desirable adhesive materials not ordinarily useful when operating technique heretofore available is applied.

A further object of the invention is one of economy by provision of a process for adhesively joining surfaces which permits an increase in production and the elimination of liquid activators, although it will be understood that the process of the present invention is also applicable in driving off liquid activators now used.

A still further and more particular object of the invention is the provision of a process for manufacturing cemented shoes which eliminates the limitations characterizing the processes generally practiced in the industry. Other objects will appear hereinafter.

These objects are accomplished by heating the cement film, which may or may not contain volatile solvents, by means of heat generated within and/or adjacent to the film by an energized field created through the agency of a high frequency electrical current.

Figure 2:
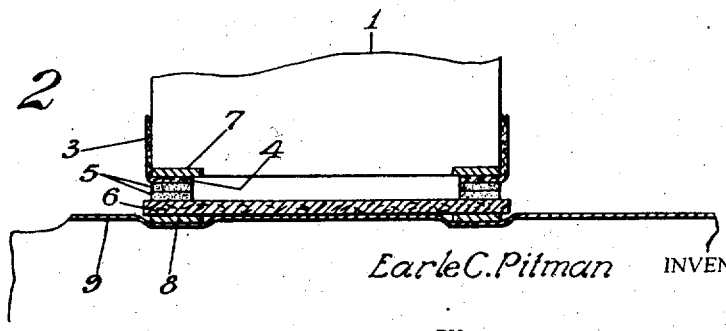

In the drawing, Figure 1 represents an elevation of a shoe in which the last is inserted. Figure 2 represents a section along the line 2—2 in Figure 1. In both figures, 1 represents the last, 2 are fixed members for holding the last in the shoe against the pressure bag 9. The sides of the shoe upper are represented as 3, and the turned under portion or welt is designated 4. The sole which is to be cemented to the upper is shown as 6, and 5 is the film of adhesive on 4 and 6. The last has an electric condenser plate or grid indicated as 7 directly above the turned over portion 4. A similar condenser plate or grid 8 is attached to the inflatable bag 9 and is of a shape similar to its companion plate 7. These two plates are connected by conductors 10 to a source of high frequency electrical current.

In the practice of the present invention, a film of a suitable thermoplastic cement composition is applied to a surface, such as leather, in any suitable manner. This composition is preferably of such character that the coated parts may be stored with surfaces in direct contact at normal temperatures without danger of sticking or the development of substantial physical or chemical change that would be detrimental to the final joining of the parts. When it is desired to join the coated parts, for example, shoe sole and the upper parts, they are assembled in a suitable pressure device modified however with high frequency electrical equipment as described. The cement is then activated by applying electrical energy in the form of high frequency current around the unit in such a manner that heat is induced in the cement film, causing thermal softening to the extent that the composition becomes tacky. The unit is then cooled while maintaining the original pressure, thus causing the cement to set-up and form a strong, durable joint. The broader aspects of the invention contemplate also the elimination of volatile solvents from cements which are activated by this means. The desired results are accomplished in the same manner; that is, by generating the necessary heat in the cement containing solvents through the medium of an energized field set up around the area by high frequency electrical current.

The following example is given by way of illustration and no limitation is intended thereby, since many modifications falling within the scope of the invention will occur to those skilled in the art.

*Example 1*

Shoe sole leather was cut into strips 6" x 1" and roughened on the flesh side as is customary practice. This surface was then coated with a 50% solution in toluol of a synthetic resin, which is a reaction product of dichlorodiethyl ether and diphenylol—3.5 dimethylcyclohexane having a melting point of about 200° F. The preparation of this resin is disclosed in co-pending application of J. A. Arvin S. N. 651,634 filed January 13, 1933, which has become Patent No. 2,060,715.

The toluol functions merely as a volatile solvent to assist in laying a suitable film of the cement and is evaporated, leaving a non-tacky surface, which permits storage of the parts until convenient to assemble. The coated parts were then brought together and held under pressure between suitable metal plates which act as a condenser. The plates were attached to a source of high frequency electrical current. Electrical energy was then applied at an input of 4.5 kv., 0.25 amp., 30 megacycles for a period of about 10 seconds. The joined parts were permitted to cool while under pressure.

The force required to pull the strips apart when joined as described and measured on a spring testing machine was about 50% greater than joints prepared by conventional practices.

The electrical energy required for activating the thermoplastic cement is produced by an oscillating circuit of any suitable type. However, since the particular manner of producing the current forms no part of the present invention, no detailed description is deemed necessary here. With respect to suitable sole-affixing machinery for adapting the present invention to the manufacture of cemented shoes, reference is made to U. S. Patent 1,945,762. The apparatus shown in this patent may be conveniently modified to include the electrical condenser plates which are required to create the necessary energized field around the unit being treated. For example, one plate may be placed at the bottom of the last and the other opposite on the bladder.

In using this equipment in the actual joining of shoe soles to uppers, the parts are coated with the same synthetic resin as described in the above example, assembled in the pressure device under pressure of about 50 pounds and an electrical current applied at 3.8 kv., 0.5 amp., and a frequency of 15.0 megacycles for a time period of 12 seconds. The unit is then cooled. This may be done by blowing air over the shoe for a few minutes while the pressure is still being applied. An efficient modification consists in providing metal conductors in the form of hollow tubes and plates and in passing a cold fluid through them. This illustrates the unique operation of the invention since the electrodes are cool while the cement is being heated to its softening point with or without the expulsion of solvent. It will be understood that the melting of the cement is not dependent upon the passage of heat by conduction from the electrodes through the leather to the cement.

In addition to the heat energizable synthetic resin described in the above example, many other thermoplastic materials have been found operable. Natural and synthetic resins such as rosin, shellac, 2-chloro-butadiene 1,3; ureaformaldehyde; polybasic acid-polyhydric alcohol; vinyl, acrylic acid resins, paratoluene sulfonamide-formaldehyde resins, etc., and mixtures of these may be used. These resins may be combined with suitable cellulose derivatives such as cellulose nitrate, cellulose acetate, ethyl cellulose, benzyl cellulose, etc. Suitable softeners to assist fusion and to add flexibility may also be included, such as dibutyl phthalate, tributyl phosphate, toluene sulfonamide, tricresyl phosphate, methoxyethyl phthalate, dibutyl tartrate and dixylolethane. In certain instances also it has been found possible to use cellulose derivatives such as ethyl cellulose or cellulose nitrate of low nitrogen content as thermoplastic adhesives without the inclusion of a thermoplastic resin, but in these cases it is preferable to include a suitable proportion of a plasticizer.

The following formulas are given to illustrate in general types of thermoplastic cement which are suitable although it will be understood that I may use practically any cement which may be correctly termed thermoplastic:

*Composition 1*

| | Percent |
|---|---|
| Cellulose nitrate (4 sec.) | 8.2 |
| Denatured alcohol | 10.0 |
| Toluol | 29.0 |
| Dibutyl phthalate | 6.4 |
| Ethyl acetate | 33.0 |
| Synthetic resin | 13.4 |
| | 100.0 |

The synthetic resin used in the above example is the reaction product of:

| | Percent |
|---|---|
| Phthalate anhydride | 45.6 |
| Glycerol | 28.8 |
| Castor oil | 25.4 |
| | 100.0 |

*Composition 2*

| | Percent |
|---|---|
| Ethyl cellulose | 15.0 |
| Dibutyl phthalate | 7.5 |
| Denatured alcohol | 39.0 |
| Toluol | 38.5 |
| | 100.0 |

*Composition 3*

| | Percent |
|---|---|
| Vinyl acetate polymer | 10.0 |
| Toluol | 90.0 |
| | 100.0 |

*Composition 4*

| | Percent |
|---|---|
| Cellulose acetate | 8.9 |
| Acetone | 40.5 |
| Diacetone alcohol | 8.3 |
| Toluol | 21.2 |
| Synthetic resin | 14.0 |
| Plasticizer | 7.1 |
| | 100.0 |

The resin used in this example is the reaction product of:

Aromatic sulfonamides and formaldehyde, and the plasticizer is a mixture of ortho- and para-toluene ethyl sulfonamide, such as "Santicizer 8."

*Example 2*

Two strips of sole leather were cleaned and sand-papered and a coating of Composition 1, given above, to which had been incorporated about 25% of fine iron filings was applied by brushing and allowed to dry until the tacky stage was reached. The two strips were then placed in contact with each other and pressed firmly together and inserted in an electrical coil carrying a current having a frequency of about 600,000 cycles. The leather strips were allowed to remain in the coil for about 7 seconds during which time the adhesive between the two strips of leather became warm and substantially all of the residual solvent was driven off. Upon removing the strips from the coil, the laminated material was allowed to cool and a very satisfactory joint was obtained.

*Example 3*

Two strips of leather were prepared in the same manner as in Example 1 except that the adhesive used was Composition 2 given above. The strips were placed between two metal grids which were connected to a source of high frequency current and at the same time were pressed together with the leather strips between the two pieces of metal. The strips were allowed to remain in this position for 30 seconds. Power was consumed at the rate of 4 kw.

*Example 4*

Two leather strips were prepared as indicated in Example 2 and were coated with Composition 4 given above. They were then treated according to the procedure outlined in Example 1 and were likewise subjected to the same electrical field.

In all of the above examples, the voltage and amperage refer to the input to that part of the apparatus producing the high frequency.

The term "high frequency" as used herein means frequencies of at least about 600,000 cycles per second.

It will be obvious from the above examples that the frequency of the current producing electrical field may vary within comparatively wide limits. This is necessarily so since the hysteresis of the various cements used vary according to the ingredients therein. For example, when a cement is used in which fine metal particles have been incorporated, the frequency of the current may be comparatively low; that is, in the hundred thousands per second. On the other hand, when the adhesive is a very poor conductor, the lag from each change of direction in the field is less and the frequency must consequently be increased. Currents having frequencies as high as 100,000,000 cycles per second or more are sometimes necessary. It has been found that with each cement an optimum change from electrical energy to heat energy is obtainable at some point within the range of frequency given above. It is impossible to state what this frequency is with a given cement since much depends on the degree of tackiness and acidity of the solvents and in general the conductivity of the adhesive. However, the optimum frequency will readily be found by testing a few different values in the above range; to those familiar with the use of currents of such frequencies, this can be done very readily.

The process is operable without the inclusion of any foreign conducting materials since the cements themselves seem to possess sufficient hysteresis to permit the eddy currents from the energized field to induce a heating effect of such magnitude as to cause fusion of the cement. However, it is also possible to operate the invention by including in the cement compositions such conducting materials as iron filings or other metal filings, graphite, granulated carbon, etc. and in some cases the addition of such foreign materials may be distinctly advantageous. The addition of small amounts of certain electrolytes such as acids and salts may be desirable, although precautions must be taken to choose such of these agents that do not adversely affect the chemical or physical constitution of the cement or the material bonded thereby. The amounts of these various types of "energy absorbers" that may be added is dependent upon numerous factors in the operation of the process but in general it is preferable to maintain them at a minimum in order to avoid any possible decrease in the strength of the ultimate joint, which might be attributed to their presence. Metal filings are sometimes objectionable because they settle and cake in the bottom of the container.

As indicated above the cement coated parts may be united while the cement film is in a tacky state.

This is particularly useful in adhesive compositions which tend to retain these solvents and the production of an acceptable joint, which is dependent upon practically complete elimination of the solvents while the parts are held together, is undesirably slow.

Many of the cements described above would ordinarily be considered fairly good insulators of low frequency current. However, from the results obtained, it seems that they have sufficient conductivity in themselves, perhaps in some cases because of the possible presence of small quantities of free acids. These acids presumably function in a manner similar to "energy absorbers" such as electrolytes or other conducting bodies as for example iron filings, which may be introduced in the cement compositions if so desired, to enhance this effect. The thermoplastic cement film, when brought within the influence of an energized field produced by a high frequency oscillating current, becomes activated by fusing, thereby causing the adjacent surfaces to be united and when subsequently cooled an effective joint is secured. This phenomenon is caused by eddy currents set up by variation in the energized field and which are induced in the conducting portion of the cement film thereby producing a heating effect that fuses the thermoplastic cement or in the case of solvent type cement compositions, expedites the elimination of the volatile solvents.

The adhesive compositions may be applied by any of the methods commonly practiced such as by brushing, spraying, dipping, etc., as a hot melt or by laying a ribbon of the material over the area which is to be joined.

It is not intended to limit the invention to the particular set of operating conditions described above since these factors may be varied over a considerable range depending upon the particular type of cement used, the time period for which the electrical energy is applied, the distance between the condenser plates, the temperature required to fuse thermoplastic cements or to solidify solvent type cements, the cement, the size and shape of the electrodes, etc., but it is believed that these variables (electrical input, frequency, etc.) will be readily apparent to those skilled in the art.

The size, shape and construction of the electrodes may also be varied. In the equipment used for the examples described above, the electrodes are metal plates approximately of the size and shape of the cement film on the shoe sole to be attached to the upper. In some cases it may be convenient to use a metal gauze and it has been found expedient also to vary the distance between the electrodes at certain points or by changing the shape of the condenser plate to prevent concentration of electrical energy at any one point with attendant overheating. This may be accomplished by slightly elevating the condenser plate at this particular area or by perforating or cutting out a segment of the plate and depending upon the proximity of the remaining area of the plate to afford sufficient energized field to generate the required heat.

In some instances it is possible also to use a magnetic coil, a device commonly used in the manufacture of radio tubes. In this case, the parts are held together under pressure with cemented surfaces adjoining, in the center of coil and suitable electrical energy applied until the cement is fused. For the manufacture of cemented shoes, however, the condenser plate type is preferred for mechanical and economical reasons. It also affords means for eliminating the volatile solvents from cement coated parts while the unit is held under pressure, thus eliminating the intermediate step of activating the cement film prior to joining the shoe parts.

The process herein described is generally applicable to the activation of hardened thermoplastic cement films or for expediting the elimination of volatile solvents from solvent type adhesives and finds particular adaptability in the manufacture of cemented shoes for uniting soles and uppers, particularly in the case of men's shoes where the adoption of cementing processes has not met with much success chiefly because of the relative thickness of the soles used in this class of shoes. The invention is also of interest in connection with the manufacture of heavy leather belting such as used industrially for power transmission. The lamination of wood and the fabrication of wallboard such as is produced by laminating wood veneer to a cement-asbestos base offer additional uses for the processes of the invention. The process is not restricted to the applications mentioned since it will find merit in related uses where requirements are similar and particularly where the application of external heat by conventional methods heretofore available would seriously injure the component parts of the structure so treated. Other applications in diversified arts where two or more materials are laminated will be obvious.

The time cycle for the complete operation of joining shoe parts is much less than that required by processes now practiced commercially, so that a considerable saving in time, labor, and machinery is effected.

The process is characterized by more accurate control since the heat generated in the cement film is directly dependent upon electrical effects which are capable of fine adjustment by suitable electrical control devices.

A cement film is uniformly activated by the new process and this provides a uniformly strong joint which insures a product less likely to fail in service or to be rejected on final inspection during manufacture because of inadequate bond over the entire area of the united surfaces.

It is apparent that many widely different embodiments of this invention may be made without departing from the spirit and scope thereof; and, therefore, it is not intended to be limited except as indicated in the appended claims.

I claim:

1. In the process of joining a plurality of parts of organic material with a thermoplastic adhesive by placing the parts together and heating the same until the adhesive is soft and subsequently allowing the joined parts to cool, the improvement which comprises developing heat in the adhesive, without injuring the organic material, by pressing the parts between two metal electrodes and supplying a high frequency electric current thereto.

2. Process of claim 1 in which the frequency of the current is of the order of 30 megacycles per second.

3. Process of claim 1 in which the parts to be joined are the sole and upper of a shoe.

4. Process of claim 1 in which the thermoplastic adhesive contains a resin.

5. Process of claim 1 in which the thermoplastic adhesive contains a cellulose derivative.

6. Process of claim 1 in which the adhesive contains a cellulose derivative, a plasticizer, and a resin.

7. Process of claim 1 in which the adhesive is tacky before heating, due to the presence of solvent.

8. A process comprising coating a surface of an organic material with an adhesive in solution and heating the adhesive, without injuring the organic material, by subjecting the adhesive to a high frequency energized field to drive off at least a portion of the solvent.

9. A process of joining a plurality of parts of organic material with an adhesive which consists in placing the adhesive in solution between the parts, pressing the parts together and heating the adhesive, without injuring the organic material, by subjecting the adhesive to a high frequency energized field until at least a portion of the solvent has been driven off.

10. A process of joining a plurality of parts of organic material which consists in coating the opposed faces of the parts with an adhesive in solution, drying the adhesive, thereafter placing the opposed parts together with the adhesive portions of each in contact with the other and heating the adhesive, without injuring the organic material, by subjecting the adhesive to the action of a high frequency energized field until the adhesive on the two parts has merged.

11. A process of joining a plurality of parts of organic material which consists in coating the opposed faces of the parts with an adhesive in solution, drying the adhesive, thereafter activating the adhesive by application of a solvent to the surface thereof, placing the parts in assembled relation with the coated portions opposed to each other and driving off the activating solvent by subjecting the adhesive, without injuring the organic material, to the action of a high frequency energized field.

12. The process of joining organic surfaces which comprises placing the surfaces to be joined together, with a film of adhesive therebetween, and placing the composite parts between two plates of a condenser connected to a source of electrical current having a frequency of at least about 600,000 cycles per second.

13. Process of causing a plastic to adhere to at least one organic surface which comprises the improvement of inserting the same between two conductors and supplying a current having a frequency of at least about 600,000 cycles per second to the said conductors, whereby the plastic is softened.

14. Process of claim 13 in which the adhesive contains an electrolyte.

15. Process of claim 13 in which the adhesive contains finely divided metallic powder.

16. Process of claim 13 in which the adhesive contains a small amount of solvent.

17. Process of claim 13 in which the parts to be joined are pressed firmly between the two conductors.

18. Process of claim 13 in which the field is set up between two plates of a condenser and the plates are maintained at about room temperature.

19. Process of joining a shoe sole and upper which comprises applying thermoplastic adhesive to at least one of the surfaces to be joined, allowing the same to dry, pressing the surfaces together between two conductors and applying a current of about 0.25 amp., and a frequency of about 30 megacycles at a voltage sufficiently high to soften the adhesive in about 10 seconds, stopping the current and allowing the same to cool.

20. Apparatus for joining two or more parts with a thermoplastic adhesive which comprises a yielding bed, an electrical conductor embedded in the surface thereof, a firm body having a similar conductor of approximately the same size and shape and means for pressing the two conductors against the opposite sides of the parts to be joined and means for supplying a high frequency electrical current to the said conductors.

21. In an apparatus for joining shoe parts by means of a thermoplastic adhesive the improvement which comprises a metal strip extending about the bottom edge of the last and a conductor embedded in a yielding body directly opposite the first mentioned conductor and means for pressing the parts to be joined between the said conductors.

22. An apparatus for joining a shoe sole and upper by means of a thermoplastic adhesive which comprises a last adapted to fit the upper snugly, a metal strip embedded in the lower edge of the last, an inflatable bag having in its upper surface a metal strip of approximately the same size and shape as the strip in the last, means to inflate the pressure bag and means to press the parts to be joined between the last and said bag, and means for supplying high frequency electrical energy to the said metal strips.

23. The process of claim 8 in which the field is a magnetic field.

24. A process for joining a plurality of parts of organic material with an adhesive, comprising heating the said adhesive, without injuring the organic material, by subjecting the adhesive to a high frequency electrical field so as to energize the adhesive, thereby causing the parts to adhere.

25. A process for joining a plurality of parts of organic material having relatively low hysteresis characteristics by means of an adhesive having relatively high hysteresis characteristics, comprising heating the said adhesive, without injuring the organic material, by subjecting the adhesive to a high frequency electric field so as to energize the adhesive, thereby causing the parts to adhere.

26. A process of joining a plurality of parts of organic material which consists in coating the opposed faces of the parts with an adhesive in solution, drying the adhesive, thereafter placing the opposed parts together under applied pressure with the adhesive portions of each in contact with the other and heating the adhesive, without injuring the organic material, by subjecting the adhesive to the action of a high frequency energized field until the adhesive on the two parts is merged.

27. A process of joining a plurality of parts of organic material which consists in coating the opposed faces of the parts with an adhesive in solution, drying the adhesive, thereafter placing the opposed parts together with the adhesive portions of each in contact with the other and heating the adhesive, without injuring the organic material, by subjecting the adhesive to the action of a high frequency energized field until the adhesive on the two parts has merged and subsequently applying suitable pressure.

28. Product of claim 12 in which the frequency is above 100 megacycles per second.

EARLE C. PITMAN.

DISCLAIMER

Re. 22,301.—*Earle C. Pitman*, Red Bank, N. J. CEMENTING PROCESS. Patent dated Apr. 13, 1943. Disclaimer filed May 13, 1946, by the assignee, *E. I. du Pont de Nemours & Company*.

Hereby disclaims claims 1–18 and 23–28.

[*Official Gazette June 25, 1946.*]